(12) United States Patent
Nordmann et al.

(10) Patent No.: US 11,872,892 B2
(45) Date of Patent: Jan. 16, 2024

(54) METHOD FOR OPERATING A MOTOR VEHICLE, CONTROL UNIT AND MOTOR VEHICLE

(71) Applicant: Robert Bosch GmbH, Stuttgart (DE)

(72) Inventors: Martin Nordmann, Oberstenfeld-Gronau (DE); Lars Bieniek, Schwäbisch Hall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 460 days.

(21) Appl. No.: 17/252,903

(22) PCT Filed: May 11, 2019

(86) PCT No.: PCT/EP2019/062110
§ 371 (c)(1),
(2) Date: Dec. 16, 2020

(87) PCT Pub. No.: WO2020/015885
PCT Pub. Date: Jan. 23, 2020

(65) Prior Publication Data
US 2021/0309114 A1    Oct. 7, 2021

(30) Foreign Application Priority Data
Jul. 19, 2018  (DE) .......................... 102018212031.5

(51) Int. Cl.
*B60L 15/20* (2006.01)
*B60K 1/02* (2006.01)

(52) U.S. Cl.
CPC ............... *B60L 15/20* (2013.01); *B60K 1/02* (2013.01); *B60L 2220/42* (2013.01);
(Continued)

(58) Field of Classification Search
None
See application file for complete search history.

(56) References Cited

U.S. PATENT DOCUMENTS

| 5,148,883 A | 9/1992 | Tanaka et al. |
| 5,376,868 A | 12/1994 | Toyoda et al. |

(Continued)

FOREIGN PATENT DOCUMENTS

| DE | 102016210126 A1 | 12/2017 |
| EP | 2623386 A1 | 8/2013 |

(Continued)

OTHER PUBLICATIONS

International Search Report for PCT/EP2019/062110, dated Jul. 16, 2019.

*Primary Examiner* — Todd Melton
*Assistant Examiner* — Jason R Roberson
(74) *Attorney, Agent, or Firm* — NORTON ROSE FULBRIGHT US LLP

(57) ABSTRACT

A method for operating a motor vehicle having multiple drive wheels and multiple drive machines, each drive machines being an electric machine and being allocated to a drive wheel. The method includes: acquiring a total setpoint drive torque; acquiring a current vehicle driving speed, a current steering angle, and optionally, the wheel loads of all drive wheels; determining wheel-individual movement speeds of the drive wheels over the roadway based on the current vehicle driving speed, the current steering angle, a known chassis geometry of the motor vehicle, and optionally, the wheel loads; determining a setpoint wheel speed for each drive wheel based on the determined movement speeds, and distributing the total setpoint drive torque to all drive wheels such that an actual curve path deviates from a setpoint curve path specified by the steering angle; actuating each drive machine to adjust the setpoint wheel speed at the respective drive wheel.

10 Claims, 1 Drawing Sheet

(52) U.S. Cl.
CPC ....... *B60L 2220/46* (2013.01); *B60L 2240/12* (2013.01); *B60L 2240/14* (2013.01); *B60L 2240/22* (2013.01); *B60L 2240/24* (2013.01); *B60L 2240/423* (2013.01); *B60L 2240/461* (2013.01); *B60L 2240/622* (2013.01); *B60L 2260/28* (2013.01)

(56) References Cited

U.S. PATENT DOCUMENTS

| | | | |
|---|---|---|---|
| 2013/0144480 A1* | 6/2013 | Kobayashi | B60K 28/16 |
| | | | 701/22 |
| 2014/0145498 A1* | 5/2014 | Yamakado | B60W 10/08 |
| | | | 303/3 |
| 2015/0314803 A1* | 11/2015 | Kojo | B60T 8/1755 |
| | | | 701/43 |
| 2016/0236679 A1 | 8/2016 | Inoue et al. | |
| 2022/0073054 A1* | 3/2022 | Sallee | B60W 40/105 |

FOREIGN PATENT DOCUMENTS

| | | |
|---|---|---|
| EP | 2676830 A1 | 12/2013 |
| EP | 2676831 A1 | 12/2013 |
| EP | 2684735 A1 | 1/2014 |
| EP | 2700532 A1 | 2/2014 |
| EP | 2783895 A1 | 10/2014 |
| EP | 2905193 A1 | 8/2015 |
| EP | 3028893 A1 | 6/2016 |
| EP | 3260343 A1 | 12/2017 |
| JP | 2006034012 A | 2/2006 |
| WO | 2017028800 A1 | 2/2017 |

* cited by examiner

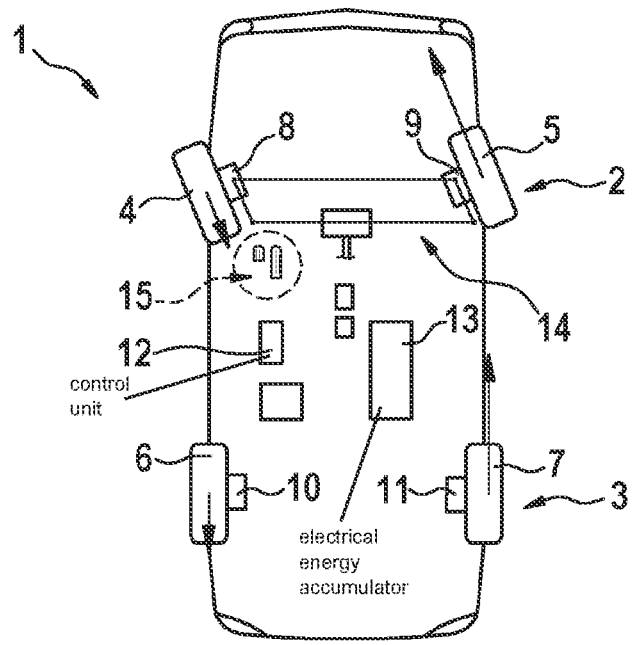
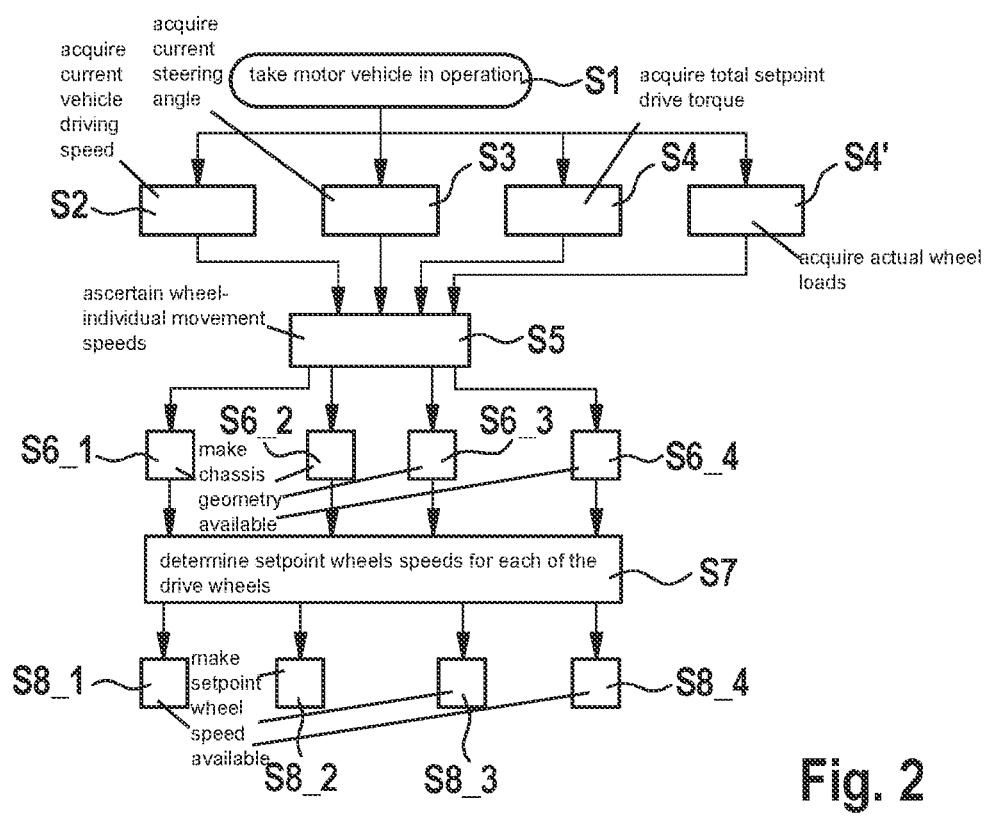

METHOD FOR OPERATING A MOTOR VEHICLE, CONTROL UNIT AND MOTOR VEHICLE

FIELD

The present invention relates to a method for operating a motor vehicle having multiple drive wheels as well as multiple drive machines, in which a drive machine, in particular an electric machine, is allocated to each drive wheel.

In addition, the present invention relates to a control unit for operating a motor vehicle, which executes the aforementioned method, as well as to a motor vehicle and such a control unit.

BACKGROUND INFORMATION

In view of the increasing electrification of motor vehicles, the electrification of the drive train increases as well. In addition to an internal combustion engine, it is conventional to provide one or more electric machine(s) as drive machines. It is also conventional to provide one or more electric machine(s) as an alternative to an internal combustion engine. To an increasing extent, concepts featuring a wheel-individual drive of the motor vehicle have also been created. To this end, an electric machine, which is individually actuable in order to generate a propulsion torque of the motor vehicle, is allocated to each drive wheel of the motor vehicle. The drive machines in a motor vehicle are usually mapped by a "torque path" in a control unit by which a driver-requested torque is converted into a total setpoint drive torque. This total setpoint drive torque or propulsion torque is output to the drive machine or the drive machines for its/their actuation.

It is furthermore conventional to specify setpoint wheel speeds of drive wheels as a function of a steering angle specified by a steering device, so that the vehicle optimally follows the setpoint curve path specified by the steering angle. A corresponding method is described in German Patent Application No. DE 10 2016 210 126 A1, for instance.

SUMMARY

An method according to an example embodiment of the present invention may have the advantage that the curve path of the motor vehicle is set independently of the steering angle specified by the steering device and the setpoint curve path resulting therefrom, in this way producing a steering response of the motor vehicle that differs from that which can be specified by the steering geometry. Thus, a steering response is offered that goes beyond conventional steering by setting steering angles of steerable wheels of the motor vehicle. According to an example embodiment of the present invention, a total setpoint drive torque is acquired for this purpose as well as a current vehicle driving speed and a current steering angle. Next, wheel-individual movement speeds of the drive wheels over the roadway are determined as a function of the current vehicle driving speed, the current steering angle, and a known chassis geometry of the motor vehicle. Depending on the determined movement speeds, a setpoint wheel speed is determined for each drive wheel, and the total drive torque is distributed to all drive wheels such that the actual curve path deviates from the setpoint curve path specified by the steering angle, each drive machine being actuated for the adjustment of the wheel-individual setpoint wheel speed. With knowledge of the chassis geometry and the behavior of the chassis as a function of a steering angle, it is advantageously possible to ascertain or determine a wheel-individual movement speed of each wheel, and thus a wheel-individual distribution of the total setpoint drive torque, so that, for example, an optimal speed over the ground without slip up to the geometrically maximum steering angle is achieved in the respective drive wheel. A closed-loop torque control of the drive machine preferably takes place, which is performed as a function of the vehicle driving speed, the chassis geometry and, optionally, the coefficients of friction at the wheels and the current steering angle. To influence the setpoint wheel speed at the respective drive wheel, either the torque of the respective drive machine is influenced or a closed-loop rotational speed control of the drive machine preferably takes place, which is carried out as a function of the vehicle driving speed, the chassis geometry and, optionally, the coefficients of friction at the wheels, and the current steering angle. In a motor vehicle having all-wheel drive and a central drive device such as an internal combustion engine, in which a power distribution is implemented via shafts and open axle differentials to the drive wheels, the setpoint wheel speeds at the drive wheels are set with the aid of mechanical wheel brakes, which brake an inner wheel or brake it more strongly than an outer wheel, in particular to the same extent to which the outer wheel is accelerated via the open differential.

The cornering is therefore able to be carried out without slip up to the geometrically maximally possible steering angle or steering stop. Only beyond this point, for tighter curve radii, will slip preferably be allowed or does slip occur. The reduction of the curve radius is achieved in that a higher setpoint wheel speed is specified for outer wheels than for inner wheels. It is also possible to reverse the direction of rotation of the inner wheels in order to change the curve radius. This makes it possible to carry out a turning maneuver in place as in a vehicle having a track drive.

The setpoint wheel speed for each drive wheel is preferably determined in such a way that a radius of the actual curve path is reduced to the radius of the setpoint curve path. With the aid of the present method, the motor vehicle drives a tighter curve than would actually be possible in terms of geometry by the steering angle of the steerable wheels. This allows for particularly tight curve radii, as mentioned earlier already.

In addition, it is preferably provided that the magnitude of the reduction be selected as a function of the current vehicle driving speed. This makes it possible to adapt the cornering behavior of the motor vehicle to the driving speed of the motor vehicle in order to ensure high driving safety on the one hand and great agility, especially at low driving speeds, on the other hand. To this end, it is particularly provided that the reduction be reduced with increasing driving speed and enlarged with a diminishing driving speed, so that high agility of the motor vehicle is ensured at low driving speeds, while great directional stability is ensured at high speeds.

According to a preferred further refinement of the present invention it is provided that when wheel-individual drives are used, the movement direction of the vehicle relative to the longitudinal vehicle axis is influenced during cornering (=side slip angle) in that elective oversteering or understeering about an imaginary curve center point is ascertained and adjusted by the selective specification of setpoint speeds of all drive wheels. For example, the inner front wheel is braked for an extreme case and all other wheels are related thereto as the "center point", in contrast to the hard braking of the inner rear wheel and a corresponding wheel speed specification for all other wheels in relation to this inner rear wheel. As an alternative, the inner rear wheel is braked hard for the extreme case and all other wheels are related to it as the center point.

According to a preferred further refinement of the present invention, it is provided to take the wheel loads of the drive wheels, which determine the propulsion moment transferrable to the roadway, into account in the wheel-individual actuation of the wheel torques and/or the wheel speeds in order always to make the maximally possible torque, and thus the maximally possible traction, available from the vehicle view as a whole.

Preferably, the wheel loads of the drive wheels or wheels of the motor vehicle are determined as a function of a wheel-individual suspension travel and/or tire pressure. For example, the tire pressure is able to be acquired using already installed tire pressure sensors, and the suspension travel can be acquired by a likewise conventional suspension travel sensor system. With knowledge of the wheel loads, it can be determined, for example, whether one of the drive wheels is suspended in the air and thus unable to transmit drive force or brake force to the roadway, or whether it is compressed and consequently able to transmit higher torques. This may also be dynamically detected between the inner and outer wheels. Also, the effective curve radius of the respective drive wheels changes with the actually existing suspension travel so that the present method is able to be executed in a particularly precise manner when the aforementioned parameters are known.

In addition, in accordance with an example embodiment of the present invention, it is preferably provided to use the aforementioned method to provide assistance in the maneuvering of vehicles. In particular on roadways having a low coefficient of friction, the vehicle tends to move toward the outer curve edge and thus tends to describe greater curve radii than desired by the driver. The actuating of individual drive wheels in such a way that the outer wheels rotate more rapidly and the inner wheels rotate more slowly makes it possible to correct the trajectory that comes about on account of the roadway conditions in comparison with the desired trajectory. This method is preferably carried out with the aid of the mentioned environment sensor system. The method is preferably performed in a vehicle having one or more steerable axle(s).

Moreover, it is preferably provided that the vehicle driving speed is ascertained, especially in addition, as a function of at least an actual rotational speed, an acceleration, a yaw rate, data from a satellite-based navigation system, and/or an environment sensor system of the motor vehicle. Of particular advantage is the acquisition of the vehicle driving speed independently of the wheel speeds of the drive wheels so that an independently ascertained vehicle driving speed is available for a comparison with the closed-loop wheel-speed control of the drive wheels for the detection of slip across all wheels. This avoids faulty controls and skidding of the vehicle. The acceleration and/or the yaw rate of the motor vehicle may also be used for determining the vehicle driving speed.

The present method is preferably carried out only at speeds below a predefinable limit value. In a wheel-individual drive featuring a closed-loop wheel speed control, the exceeding of the grip limit of the drive wheels may cause multiple or all wheels to spin simultaneously so that the motor vehicle could become unstable as a result. Because the driving is carried out only at speeds below the predefinable limit value, the effects of an unstable driving state are easier to correct. A correspondingly safe limit value is selected and ascertained with the aid of tests, for instance. In addition, this sudden loss of traction is detected in particular with the aid of the vehicle driving speed, ascertained independently of the rotational speeds, and/or with the aid of the ascertained acceleration and/or yaw rate.

As an alternative or in addition, it is preferably provided to activate the afore-described method via a separate driving-mode selector switch, which must explicitly be selected by the driver in order to prevent unintended damage to the axle geometry or the steering device. The output rotational angle signal of the steering sensor (e.g., steering wheel) as a function of the speed of the motor vehicle and the position of the switch is adapted insofar as an activation takes place only beyond a noticeable point. This may be accomplished by enabling an additional steering angle of the steering sensor (e.g., steering wheel) or via the alternative calibration of the existing steering angle. The method is switched off within the defined range and the steering behavior is as usual; outside the defined steering angle range, the method is active and the steering system allows for tight cornering.

In addition, it is preferably provided that a current roadway condition is ascertained and the present method is carried out as a function of the current roadway condition. In particular, an (automatic or a manual) power limitation as a function of the current roadway condition is implemented in order to avoid an excessive bias, and thus damage to the drive current. The roadway condition is able to be detected with the aid of the data from the satellite-based navigation system, for example, and/or a camera-based environment sensor system providing an image evaluation, or with the aid of data from an electronic stability program (ESP).

Preferably, it is furthermore provided to control the setpoint rotational speeds. This makes it possible to keep the present method simple. However, because the precision of the control in a controlled system depends on the acquired parameters and these are limited in view of the desired simplicity of the system, e.g., without a vehicle-independent speed acquisition and without a wheel-load acquisition, the controlled operation is preferably carried out only at low speeds, in particular below the mentioned limit value. Alternatively, the setpoint rotational speeds are controlled in the above-mentioned manner.

In addition, it is preferably provided that the driver (sitting in the vehicle or in a manner controlled remotely from outside the vehicle) is able to call up preprogrammed driving functions. Without excluding others, these could be the following, for example:

A. Launch control: All power units are "preloaded" in such a way that all play in the drive train is eliminated in order to avoid an abrupt power alteration when taking off (e.g., wheel drive torque counteracted using wheel brakes). In addition, system limits are raised for the temporary special situation, or in other words, brief overloading is permitted.

B. Evasive Maneuver: The vehicle is at a standstill or comes to a standstill after forward driving. The activation of the method ensures that the vehicle maximally accelerates backwards and then executes a 180° turn so that it maintains the direction at full speed but continues its travel by driving forward after completing the turn. In the process, the wheels are steered, braked and driven in a wheel-individual manner and selectively pulled into slip in order to exclude tilting of the vehicle. When the feature is used, the condition of the roadway is preferably ascertained so that the precision of the maneuver is increased and the drive train not overloaded. In addition, this method is preferably used in combination with the environment sensor system to ensure that the vehicle stays on the roadway.

C. Donut: The vehicle is at a standstill or driving slowly up to a speed limit to be defined, and after activation of this feature begins to draw "circles or donuts" on the roadway on its own, for example in that the front wheels are turned and the rear wheels are accelerated and pulled into slip so that the vehicle rear rotates about the front inner wheel. When using this method, the roadway condition is preferably ascertained in an effort to increase the precision of the maneuver and not to overload the drive train. Furthermore, this feature is preferably used in combination with the environment sensor system to ensure that the vehicle stays on the roadway.

D. Turning in place: The vehicle is at a standstill and begins to rotate precisely in place after the feature is activated. When using the method, the roadway condition is preferably ascertained in order to increase the precision of the maneuver and not to overload the drive train. In addition, this method is preferably used in combination with an environment sensor system to ensure that the vehicle stays on the roadway.

A control unit according to the present invention in accordance with an example embodiment of the present invention is specifically configured for executing the method according to the present invention when used as intended. In the process, the above-mentioned advantages are obtained for the motor vehicle.

A motor vehicle according to an example embodiment of the present invention includes the example control unit according to the present invention. The above-mentioned advantages are obtained as a result.

Additional advantages and preferred features and feature combinations result in particular from the description herein and the figures.

Toward this end, the present invention is described in greater detail based on the figures.

BRIEF DESCRIPTION OF THE DRAWINGS

FIG. 1 shows a motor vehicle in a simplified top view in accordance with an example embodiment of the present invention.

FIG. 2 shows a flow diagram to describe an advantageous method for operating the motor vehicle in accordance with an example embodiment of the present invention.

DETAILED DESCRIPTION OF EXAMPLE EMBODIMENTS

FIG. 1 shows a simplified top view of a motor vehicle 1, which has a front wheel axle 2 and a rear wheel axle 3. Both wheel axles 2, 3 have two drive wheels 4, 5 and 6,7 in each case. A drive machine 8, 9, 10, 11, which is developed as an electric machine in each case, is allocated to each drive wheel 4 through 7. Drive machines 8 through 11 are developed as drive machines in close proximity to the wheel, in particular as wheel hub drive machines, which are able to transmit a positive or a negative drive torque to the respective associated drive wheel 4 through 7, either directly or with the aid of a transmission gear unit. A control unit 12 is provided to actuate drive machines 8 through 11, which is connected to drive machines 8 through 11 in terms of signaling technology. In addition, drive machines 8 through 11 are connected to an electrical energy accumulator 13 by a power electronics in each case, which supplies drive machines 8 through 11 with electrical energy for a motor operation or which stores electrical energy in a generator-type operation of drive machines 8 through 11. In addition, a steering device 14 is allocated to at least one of wheel axles 2, 3, in this instance to front wheel axle 2, with whose aid a steering angle is able to be adjusted at drive wheels 4, 5.

Control unit 12 actuates drive machines 8 through 11 as a function of a requested total setpoint drive torque, which a driver of motor vehicle 1 is able to specify by operating a pedal device 15, for instance, and as a function of a requested steering angle, which is specifiable by operating steering device 14, for example, so that they jointly exert a propulsion moment on motor vehicle 1.

Because of the wheel-individual electric drive, a rapid control and selective actuation of the individual drive wheels is possible. For this purpose, the method for operating motor vehicle 1 described in greater detail in FIG. 2 is carried out, in particular by control unit 12.

FIG. 2 shows a flow diagram based on which the advantageous method is going to be described. In a first step S1, motor vehicle 1 is taken into operation. Next, in a step S2, a current vehicle driving speed is acquired, in a step S3 a current steering angle of steering device 14 is acquired, and optionally, in a step S4', actual wheel loads of all drive wheels 4 through 7 are acquired, and in a step S4, the total setpoint drive torque requested by the driver. Steps S2, S3, S4 and S4' are carried out either one after the other but preferably at the same time. To determine the wheel loads, the wheel-individual suspension travels of the chassis and/or the tire pressure applied at the respective drive wheel is/are acquired and evaluated, in particular.

In a subsequent step S5, wheel-individual movement speeds are ascertained as a function of the current vehicle driving speed, the steering angle, the wheel loads, and the known chassis geometry of the chassis of motor vehicle 1 and made available in a step S6_1, S6_2, S6_3 and S6_4 to each one of drive wheels 4 through 7. The chassis geometry in particular results from the positioning of drive wheels 4 through 7 as well as their change on account of different wheel loads and/or by an intervention of steering device 14. Because the geometrical correlations are known from the construction of motor vehicle 1, they are easily able to be taken into account by control unit 12 in order to determine a precise, wheel-individual movement speed on a roadway (not shown in the figure).

In a subsequent step S7, setpoint wheel speeds for each one of the drive wheels are determined as a function of the wheel-individual movement speeds and the requested steering angle such that an actual curve path of the motor vehicle deviates from a setpoint curve path specified by the steering angle, in particular has a smaller radius in comparison with the setpoint curve path. The ascertained setpoint wheel speeds are then made available to the drive machines in steps S8_1 through S8_4. Because the chassis and the steering geometry of the motor vehicle are known and are able to be mapped by the control unit in a software/in an algorithm, the path of each drive wheel across the ground or across the roadway and relative to the other drive wheels is able to be determined in absolute terms at all times also when cornering and driving on uneven terrain. Because the wheel load distribution of all wheels is known with the aid of the suspension travel sensor system or some other sensor system, the total propulsion moment (or brake torque) is distributed to drive wheels 4 through 7 as a function of these wheel loads. The suspension travel has an effect on the distance each drive wheel has to travel or has traveled, and the wheel load has an effect on the transmittable torque at the wheel. It is possible to infer the suspension travel and the wheel load on the basis of the acquired tire pressure, for example. The ground condition may be inferred with the aid of the suitable sensor system, and thus also the coefficient of friction (alternatively manually adjusted), so that the total propulsion moment can therefore be limited. Given knowledge of the geometry in combination with the closed-loop rotational speed control by wheel-individual drive machines 8 through 11, a smaller curve radius than would geometrically be possible using the steering geometry is adjusted in such a way that multiple or all drive wheels 4 through 7 may generate (lateral) slip on the roadway by their movement outside their intended geometry and cause damage to the ground surface, for example, depending on the composition. In the event that a limited total propulsion moment is reached, in particular in order to protect drive train components, prior to reaching the driver request, the vehicle becomes slower or simply stands still, and no damage occurs to the ground surface (e.g., on dry asphalt). If the total propulsion moment with high traction of the drive wheels is of sufficient magnitude to enable cornering using a radius smaller than specified by the steering geometry, there is the risk of damage to the drive train, the wheel suspensions or the steering.

Another advantage over conventional approaches in motor vehicles is that this function is operative solely on the basis of rotational speed information in wheel-individual drive machines 8 through 11, even without friction-brake devices and their wheel-speed acquisition or monitoring.

In an advantageous manner, according to the present invention, a sudden loss of traction of all drive wheels 4 through 7 is detected by ascertaining the abrupt loss of traction, in particular through measurements, independent of the wheel speed, of the vehicle driving speed, acceleration and/or yaw rate of motor vehicle 1, in comparison with the wheel speeds or setpoint wheel speeds of drive wheels 4 through 7. As an alternative, it is provided that the present method is carried out only if the motor vehicle is moving at vehicle driving speeds below a predefinable limit value, possibly aided by a power restriction as a function of the condition of the roadway on which motor vehicle 1 is traveling. In this way an exceeding of the traction limit of multiple drive wheels 4 through 7, in particular of all of them, does not lead to driving situations that are difficult to control in terms of driving dynamics. The power restriction is preferably implemented as a function of a coefficient of friction for previously known roadway conditions such as asphalt, grass, gravel or the like, the power restriction being manually selectable or automatically adjustable/detectable using a corresponding sensor system.

In order to keep the system simple, an exclusively controlled function of the closed-loop rotational speed control is provided. However, since the accuracy of the control depends on the acquired parameters in the controlled system and these parameters are limited in view of the desired simplicity of the system, the controlled operation may lead more rapidly to undesired strains and thus to damage in the drive system, e.g., due to different tire pressures and/or tread depths of the drive wheels, which have an effect on the vehicle dynamics. In order to reduce these influences, the controlled operation is preferably carried out on roadways featuring a reduced coefficient of friction on which spinning of the drive wheels 4 through 7 is to be prevented, and is carried out at speeds below the above-mentioned limit value.

In an advantageous manner, the described method or system (both closed-loop as well as open-loop) is used in motor vehicles having wheel-individual drive on surfaces featuring a low coefficient of friction in order to allow for slip at multiple or all drive wheels and to prevent damage to the drive system. In the case of sensitive surfaces such as lawns or forest floors, this may entail damage to the ground surface.

What is claimed is:

1. A method for operating a motor vehicle, which has multiple drive wheels and multiple drive machines, each of the drive machines being an electric machine, being allocated to a respective drive wheel of the drive wheels, the method comprising the following steps:

acquiring a total setpoint drive torque;
acquiring a current vehicle driving speed and a current steering angle;
determining respective wheel speeds of the drive wheels over a roadway as a function of the current vehicle driving speed, the current steering angle, and a known chassis geometry of the motor vehicle;
determining a setpoint wheel speed for each of the drive wheels as a function of the determined wheel speeds and the current steering angle in such a way that a radius of an actual curve path is set that is smaller than a radius of a setpoint curve path specified by a maximally possible steering angle, in the process of which multiple drive wheels produce slip;
distributing the total setpoint drive torque to all drive wheels as a function of the wheel loads in order to influence the setpoint speed at the respective drive wheel; and
actuating each of the drive machines in order to adjust the setpoint wheel speed and the respective torque at the respective drive wheel.

2. The method as recited in claim 1, wherein wheel loads of all of the drive wheels are acquired and wherein the respective wheel speeds of the drive wheels over the roadway are also determined as a function of the acquired wheel loads.

3. The method as recited in claim 1, wherein a magnitude of the reduction is selected as a function of the current vehicle driving speed.

4. The method as recited in claim 3, wherein a magnitude of the reduction is reduced with an increasing driving speed.

5. The method as recited in claim 1, wherein the vehicle driving speed is ascertained as a function of at least an actual wheel speed, and/or an acceleration, and/or a yaw rate, and/or data from a satellite-based navigation system, and/or an environment sensor system of the motor vehicle.

6. The method as recited in claim 1, wherein the method is carried out only at speeds below a predefinable limit value.

7. The method as recited in claim 1, wherein a current roadway condition is ascertained and the method is carried out as a function of the current roadway condition.

8. The method as recited in claim 1, wherein the setpoint wheel speeds are regulated or controlled.

9. A control unit for operating a motor vehicle, which has multiple drive wheels and multiple drive machines, each of the drive machines is an electric machine and is allocated to a respective drive wheel of the drive wheels, the control unit configured to:

acquire a total setpoint drive torque;
acquire a current vehicle driving speed and a current steering angle;
determine respective wheel speeds of the drive wheels over a roadway as a function of the current vehicle driving speed, the current steering angle, and a known chassis geometry of the motor vehicle;

determine a setpoint wheel speed for each of the drive wheels as a function of the determined wheel speeds and the current steering angle in such a way that a radius of an actual curve path is set that is smaller than a radius of a setpoint curve path specified by a maximally possible steering angle in the process of which multiple drive wheels produce slip;

distribute the total setpoint drive torque to all drive wheels as a function of the wheel loads in order to influence the setpoint speed at the respective drive wheel; and actuate each of the drive machines in order to adjust the setpoint wheel speed and the respective torque at the respective drive wheel.

10. A motor vehicle, comprising:

multiple drive wheels;

multiple drive machines, each of the drive machines being allocated to a respective drive wheel of the drive wheels, and each of the drive machines being an electric machine; and a control unit configured to:
   acquire a total setpoint drive torque;
   acquire a current vehicle driving speed and a current steering angle;
     determine respective wheel speeds of the drive wheels over a roadway as a function of the current vehicle driving speed, the current steering angle, and a known chassis geometry of the motor vehicle;
     determine a setpoint wheel speed for each of the drive wheels as a function of the determined wheel speeds and the current steering angle in such a way that a radius of an actual curve path is set that is smaller than a radius of a setpoint curve path specified by a maximally possible steering angle, in the process of which multiple drive wheels produce slip;

distribute the total setpoint drive torque to all drive wheels as a function of the wheel loads in order to influence the setpoint speed at the respective drive wheel; and actuate each of the drive machines in order to adjust the setpoint wheel speed and the respective torque at the respective drive wheel.

\* \* \* \* \*